United States Patent [19]

Puryear

[11] 4,200,248

[45] Apr. 29, 1980

[54] INTERNAL DISC DRAG FOR SPINNING REEL

[75] Inventor: John W. Puryear, Tulsa, Okla.

[73] Assignee: Brunswick Corporation, Skokie, Ill.

[21] Appl. No.: 932,843

[22] Filed: Aug. 11, 1978

[51] Int. Cl.² ............................................. A01K 89/02
[52] U.S. Cl. ............................................. 242/84.51 A
[58] Field of Search ................. 242/84.21 A, 84.21 R, 242/84.2 R, 84.2 G, 84.51 A, 84.5 A, 84.51 R, 84.5 R

[56] References Cited

U.S. PATENT DOCUMENTS

| | | | |
|---|---|---|---|
| 2,687,855 | 8/1954 | Shakespeare et al. | 242/84.21 R |
| 2,901,193 | 8/1959 | Askins et al. | 242/84.21 R |
| 3,226,051 | 12/1965 | Sarah | 242/84.21 A |

*Primary Examiner*—Billy S. Taylor
*Attorney, Agent, or Firm*—John G. Heimovics

[57] ABSTRACT

This invention comprehends a free-floating drag mechanism that is adaptable for use in conventional spinning reels and skirted style spinning reels. The free-floating drag is mounted at the rear of the fishing reel and is keyed to the main shaft that holds the spool. When the drag is tightened down the spool cannot rotate and as the drag is loosened the spool is able to rotate paying out line from the spool without the bail being opened.

15 Claims, 7 Drawing Figures

INTERNAL DISC DRAG FOR SPINNING REEL

BACKGROUND OF THE INVENTION

1. Field of the Invention

This invention relates to conventional and skirted style spinning reels, and more particularly, relates to a unique free-floating drag mechanism that is mounted in the rear of the housing of the fishing reels.

2. Background of the Prior Art

It is well known in the prior art to utilize drag mechanisms mounted in the spool of conventional spinning reels and skirted style spinning reels. This drag mechanism has many undesirable characteristics such as non-linear drag response, difficult to adjust when playing a fish on the end of a fishing rod and reel, subject to loosening and thereby losing the spool during fishing, and many more. Some years ago a fishing reel was produced in the marketplace that had a drag system located at the rear of the reel rather than incorporated in the spool but it was found that this mechanism had certain drawbacks in that it was not free-floating and it did not fit coaxially on the main shaft. As a consequence thereof it did not have a linear spring response which means that a fisherman when tightening the drag would not know how much drag he would increase as he turned the drag adjustment knob. Thus, the prior art has failed to teach how to utilize a free-floating drag mechanism mounted in the rear of a reel housing whereby it would have a linear spring response.

SUMMARY OF THE INVENTION

This invention relates to conventional style and skirted style spinning reels that incorporate a free-floating drag mechanism therein. The reel broadly comprehends this free-floating drag mechanism that is secured at the rear of the housing having an adjustment knob that sticks out the rear of the fishing reel. Location of the drag makes it very advantageous for a fisherman to adjust the drag by means of its knob while he is fishing since the drag does not get in the way of the fishing line. This particular drag system solves many of the problems unanswered by the prior art. It also provides the possibility of having a linear spring response.

It is therefore an object of this invention to provide a free-floating drag mechanism for producing a drag in both conventional and skirted style spinning reels.

It is another object of this invention to provide such a drag which is located at the rear of the fishing reel.

Yet another object of the invention is to provide such a drag system whereby it is coaxially mounted on the main shaft of the fishing reel that holds the fishing reel spool.

Still yet another object of this invention is to provide such a drag whereby it has a linear spring response so that the restraining force of the drag is constantly variable on the fishing reel and not erratic as those in the prior art.

A feature of the invention is the utilization of the free-floating drag mounted inside the gear case or housing so that the drag is not exposed to the elements.

The above and other and further objects and features will be more readily understood by reference to the following detailed descriptions and accompanying drawings.

DESCRIPTION OF THE PREFERRED EMBODIMENTS

Figure 1:
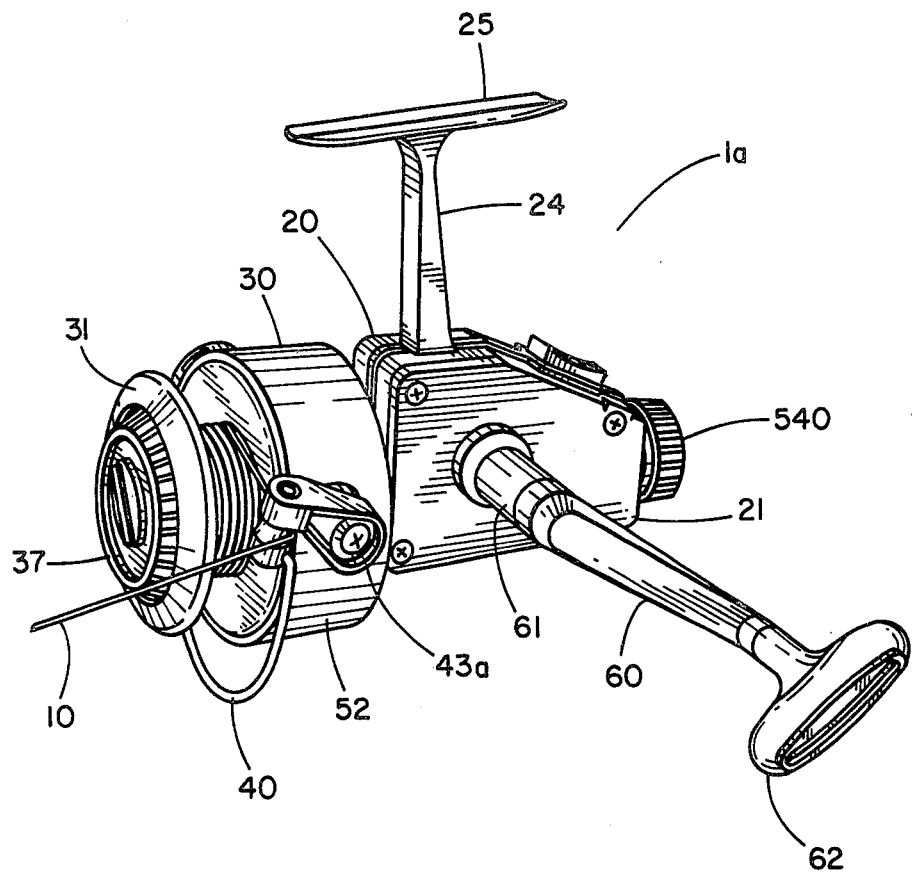
FIG. 1 is a perspective view of the conventional style spinning reel containing the invention described herein.
Figure 2:
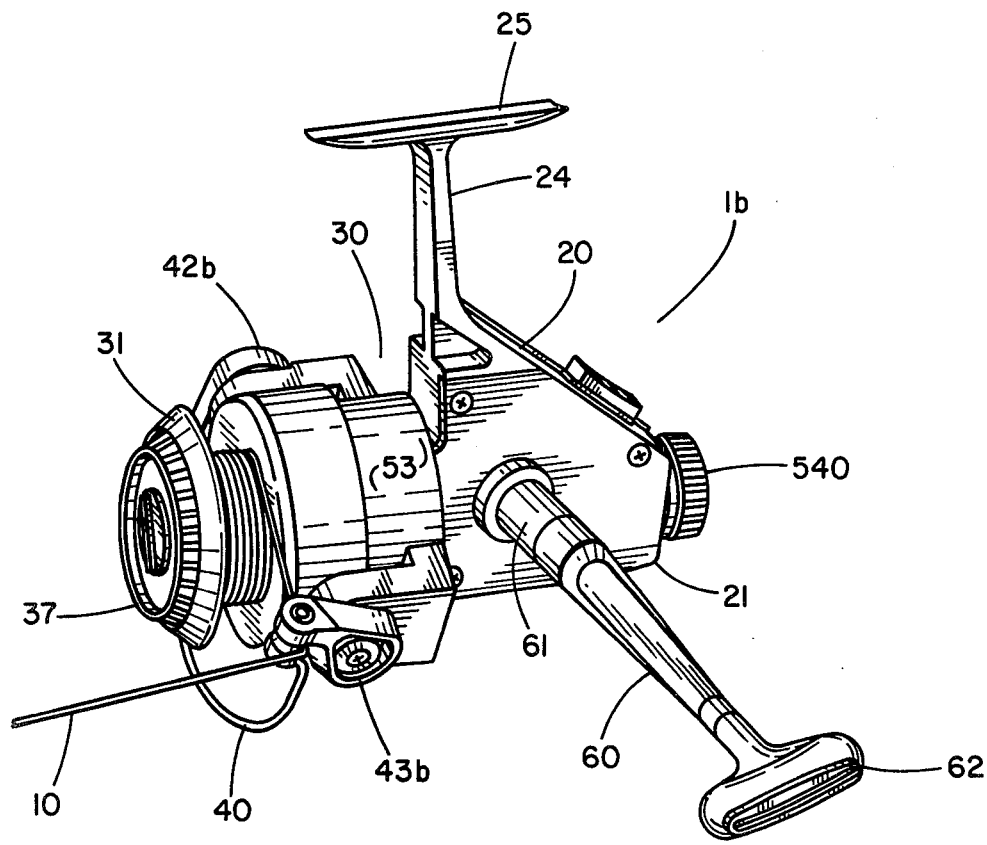
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter the handle 62 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Figure 3:
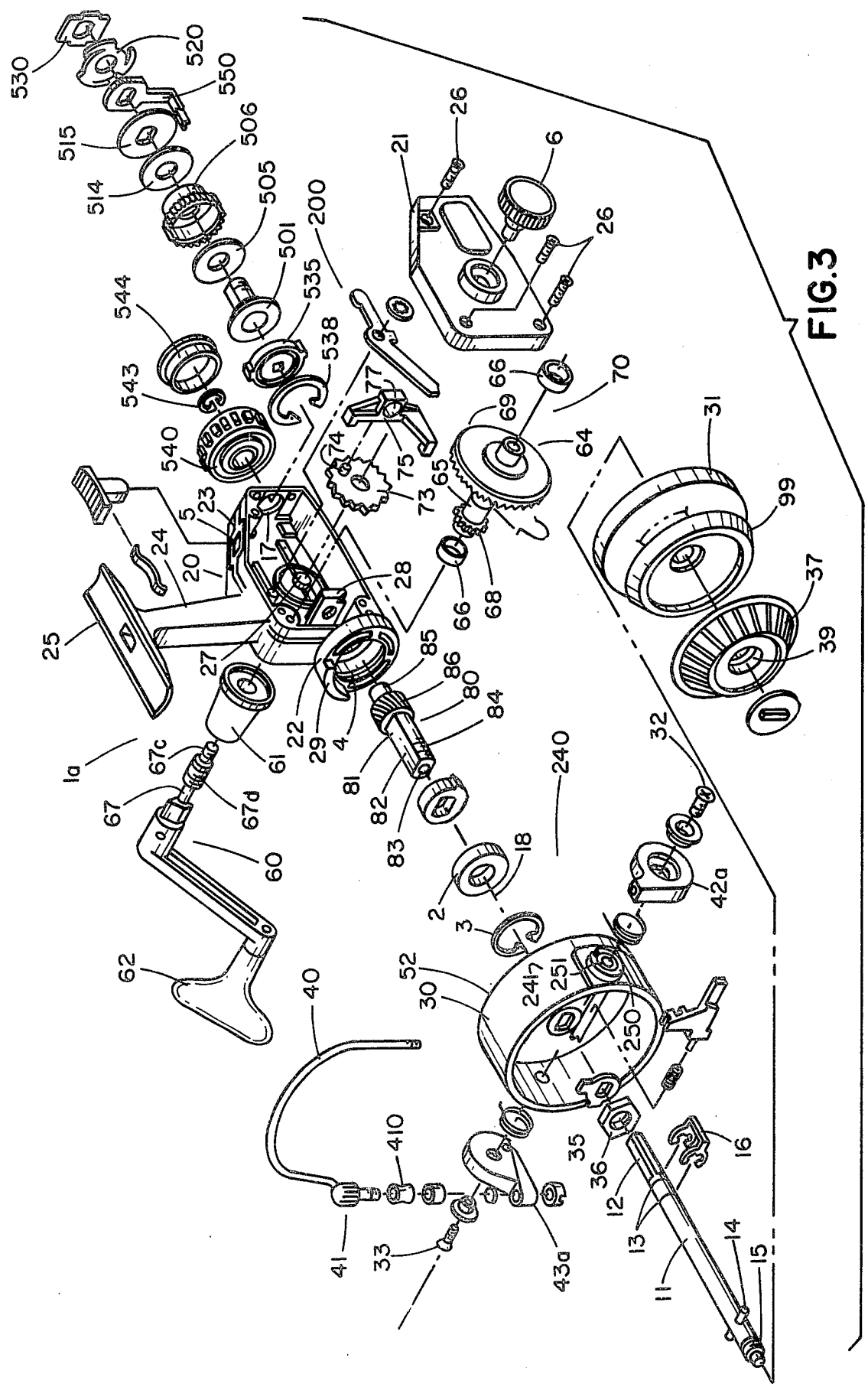
FIG. 3 is an exploded perspective view of the conventional style spinning reel containing the invention described herein.
Figure 6:
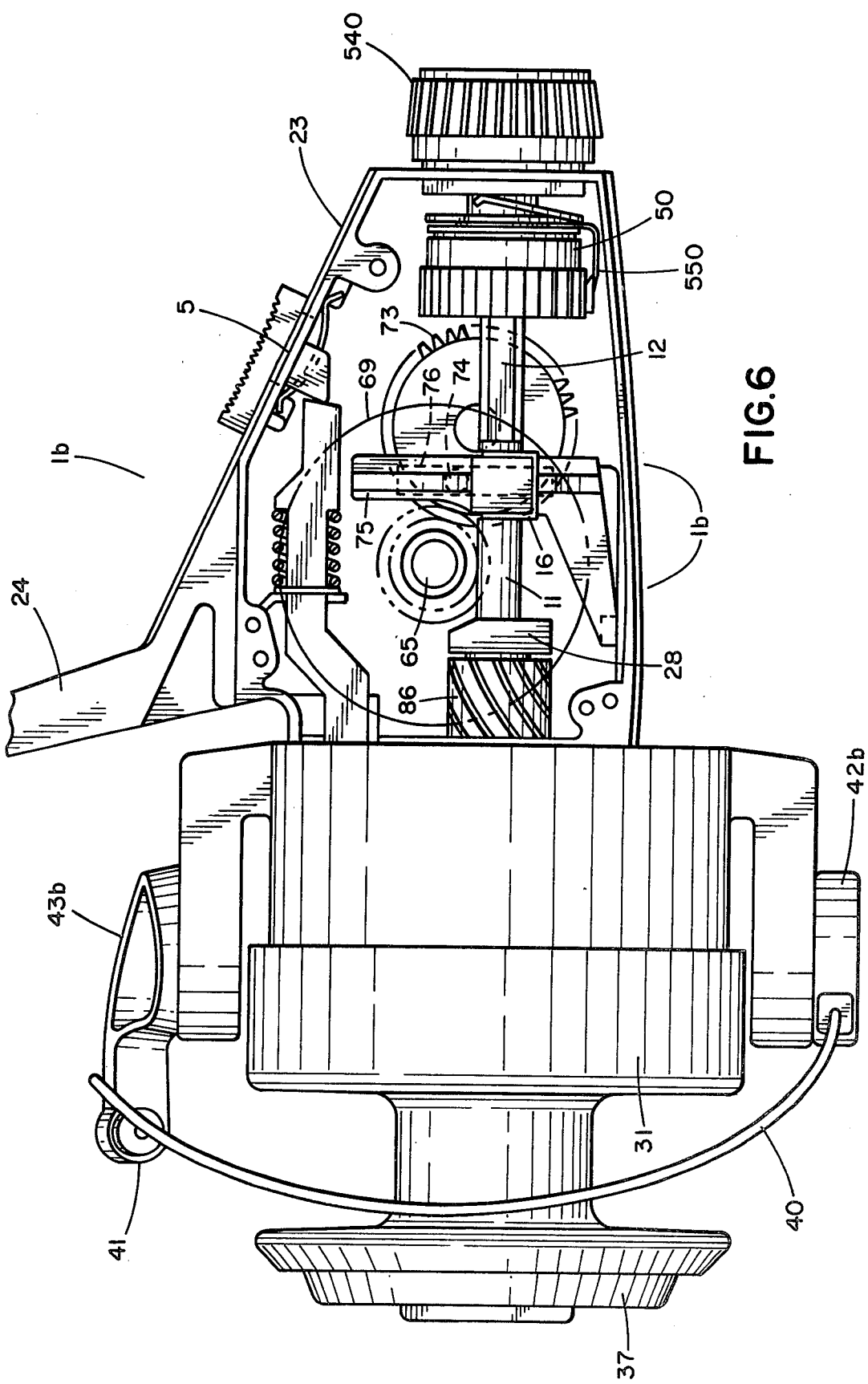
FIG. 6 is a cutaway side view of the skirted style spinning reel depicting the relative location of some of the parts of the reel.
Figure 7:
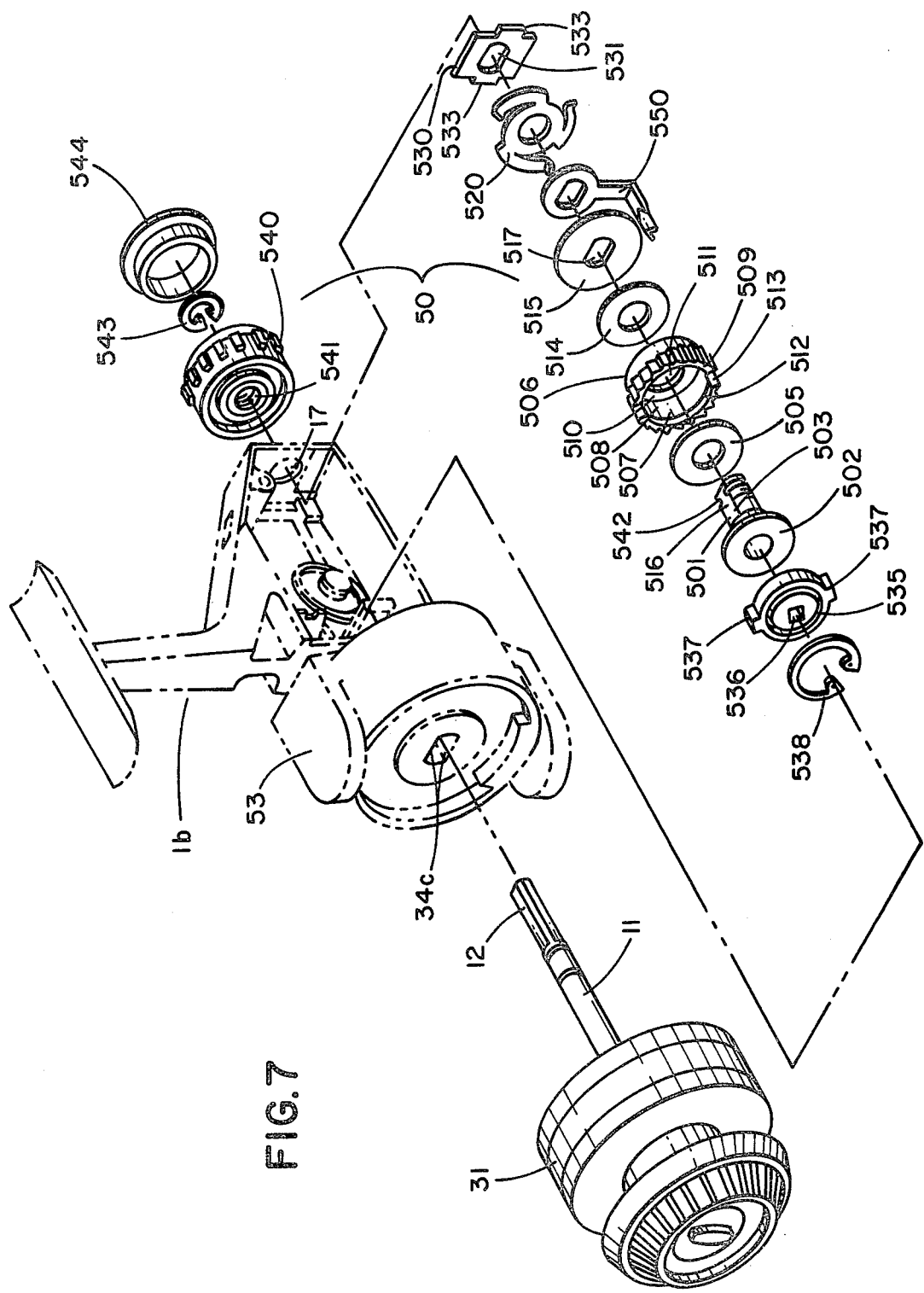
FIG. 7 is an exploded perspective view of the skirted style spinning reel shown in phantom and the drag mechanism shown in detail.

Contrary to standard spinning reels that have their drag associated with the front spool or locked into the back portion of the housing, the drag mechanism 50 is free-floating (it is self-contained as a unit and not captured in the housing). As best seen in FIGS. 3 and 7, the drag housing cup 506 has an internal cavity 507 with a back closure 510 with a concentric hole 511 therein. A first flat friction disc washer 505 with a round hole fits inside cup 506. The drag adjustment screw 501 with elongated shank 503 having a threaded portion at one end and side flats 516 is positioned so that the shank 503 extends out the back side of the closure 510. The disc 505 being captured between closure 510 and the washer portion 502 of the screw 501. A disc drive 535 with lugs 537 fits into the cup cavity 507 with the lugs 537 fitting in notches 513. Retainer clip 538 is secured to the front groove 512 to prevent the drive 513 from becoming disassembled from the cup 506. On the rearward extending shank 503 a second friction disc 514, a flat washer 515 with hole 517 that matches the cross section of the shank 503, a disc spring 512 and an aligning plate 530 which may be rectangular shaped with hole 531 similar to 517 is placed thereon. In one embodiment of the invention, clicker 550 is placed on the shank as shown in FIGS. 3, 5, 6 and 7. This compact unit comprises the forward portion of the drag mechanism 50 that is contained within the gear case 23. The remaining portion of the shank 503 slips through hole 17 at the back of the housing 20. Adjustment knob 540 is secured on the shank 503 by means of internal nut 541 and locked in place by positioning retainer 543 in groove 542.

The square end 12 of the shaft 11 slip fits into hole 536. When the knob 540 is tightened against the housing case 23, spring 520 becomes trapped between the plate 530 and the washer 515. As the knob 540 is further tightened, the friction discs 505 and 514 clamp the back closure 510 tighter and tighter thereby preventing the cup 506 from rotating. Since the square end 12 of the shaft 11 is keyed to the drive 535 and the rectangular shape of plate 530 and the lugs 533 prevent the mechanism 50 from rotating inside the gear case 23, the shaft 11 is thereby prevented from rotating; thus the drag is fully functional and there is no rotational movement of the spool 31. Alternatively, any type of key shaped arrangement such a D-shape, spline, keyed, flattened, swedged, cross drilled with a pin similar to a U-joint, hex-shaped, pentagon-shaped, and the like may be used for the shaft end 12 and the mating hole 536. When the knob 540 is loosened, there is less clamping force by the discs 505 and 514 and therefore limited rotation of the free-floating mechanism 50 is permitted which in turn permits the limited rotation of the spool 31 when there is tension force on the line 10. The teeth 509 on the cup 506 provide for heat dissipation.

The spring 520 by means of its three arms which are double leaf springs provides a linear spring response as the knob 540 is tightened down. Thus, it is possible to utilize the drag in such a manner that as the drag knob 540 is tightened the force needed to pull the fishing line from the spool is increased in a linear fashion rather than the prior art teachings where it was nonlinear.

Figure 4:
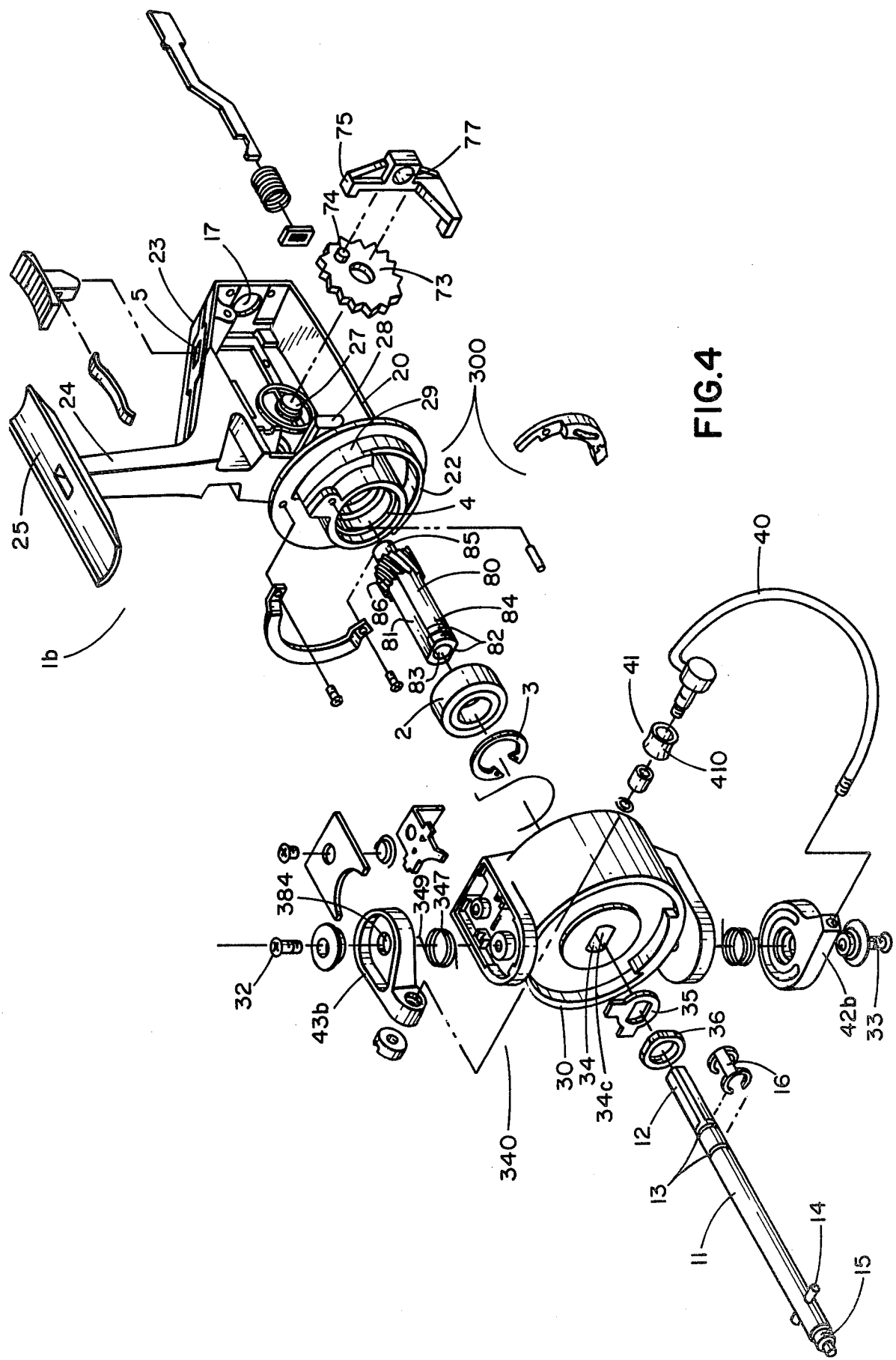
FIG. 4 is an exploded perspective view of the skirted style spinning reel not depicting some of the parts in common with the conventional reel shown in FIG. 3 but capable of incorporating the invention described herein.
Figure 5:
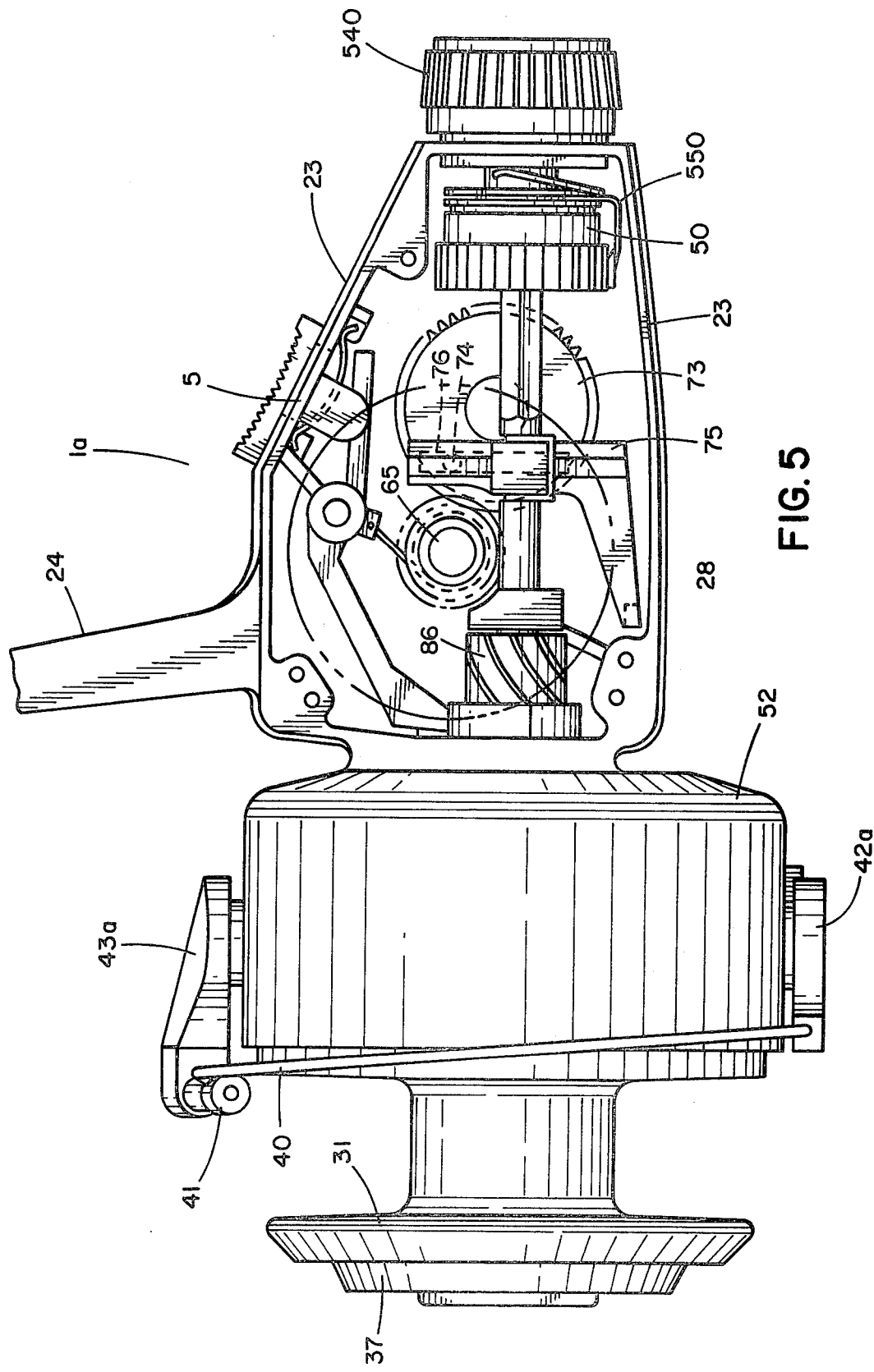
FIG. 5 is a cutaway side view of the conventional style spinning reel depicting the relative location of some of the parts of the reel.

A unique feature of reels 1a and 1b is the combined anti-reverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backward or in the counterclockwise direction when the reel is viewed from the face or spool 31. In the conventional reel 1a shown in FIGS. 1, 3 and 5, self-centering mechanism 200 is depicted and in the skirted reel 1b as shown in FIGS. 2, 4 and 6, the self-centering mechanism 300 is depicted.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 30 and cooperates with the cam surface 29 on the front of the housing 20.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing, a center shaft mounted in the housing, with a major portion of the shaft in the housing, a spool securely mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, limited rotation of the spool being desirable when retrieving the bait with a fish caught thereon, the improvement comprising a free-floating drag assembly that permits such limited spool rotation;
   (a) the center shaft having a forward end supporting the spool and a rearward end with a modified keyable shaft portion,
   (b) a drag adjustment screw mounted on the shaft and having a washer portion and an elongated shank, the shank having a longitudinal keyable portion and a threaded end, the shank having a concentric longitudinal hole, the rearward end of the shaft mounted in the shank hole and partially supported thereby,
   (c) first friction means mounted on the shank adjacent the washer portion,
   (d) a housing cup having a back closure with a center hole therein and having an intersurface and an exterior surface and a circular side wall secured at a first end of the interior surface of the closure and a second end being open, the wall having an exterior surface and at least one open notch extending through the wall at the second end, the center hole sufficiently large for slip-fit mounting the cup on the shank adjacent the first means,
   (e) second friction means mounted on the shank adjacent the exterior surface of the back closure,
   (f) a washer keyable mounted on the shank and adjacent the second means,
   (g) a spring mounted on the shank adjacent the flat washer,
   (h) an alignment plate keyable mounted on the shank being adjacent the spring, means on the exterior of the plate for preventing rotation of the screw when mounted in the housing, the spring having radially projecting arms in contact with the washer,
   (i) a drive mounted in the cup having a central hole keyed to the shaft, the drive having a lug mating with the notch in the cup wall so that when the shaft rotates the drive causes the cup to rotate,
   (j) means for securing the drive, the washer portion of the shank and the first friction means in the cup,
   (k) a hole in the housing coaxial with the shaft, the threaded end of the shank mounted in the housing hole with a portion thereof extending outside the housing, and
   (l) means mounted on the threaded shank for tightening or loosening the drag assembly.

2. The reel of claim 1 wherein the means for tightening include a drag knob having a nut with a screw mounted on the end of the shank exterior to the housing, the keyable end of the shaft being positioned in the shank hole with slip-fit mating with the drive hole, when the knob is tightened the spring forces the first and second friction means to tightly grip the back closure of the cup, the plate prevents the drag assembly from rotation in the housing which in turn prevents the drive and mating shank from rotating, as the knob is loosened the spring tension relaxes thereby permitting limited rotation of the drive and the shaft and concomitantly permitting rotation of the spool.

3. The reel of claim 2 wherein the elongated shank has a undercut groove near the end of the threaded portion.

4. The reel of claim 3 wherein a retainer ring fits into the undercut groove of the adjustment screw so that the knob cannot be removed therefrom.

5. The reel of claim 4 further including an end cap positioned in the drag knob so as to seal off the retainer ring from the outside elements.

6. The reel of 1 wherein means for preventing rotation on the alignment plate comprises a pair of outwardly extending lugs that prevent rotation of the plate.

7. The reel of claim 1 wherein the external surface wall of the cup is a tooth-shaped serrated surface and functions as a heat sink dissipating heat from the free-floating drag.

8. The reel of any one of claims 1-6 wherein the adjacent screw shank is semi-cylindrical with oppositely spaced flate portions thereon.

9. The reel of any one of claims 1-6 wherein the cup has an internal groove adjacent the second end.

10. The reel of claim 9 wherein the internal means for securing is a retainer clip positioned in the groove.

11. The reel of any one of claims 1-6 wherein the keyed hole in the drive and the keyable portion of the end of the shaft comprise a square hole and a square-shaped shaft end.

12. The reel of any one of claims 1-6 wherein the keyed hole in the drive and the keyable portion of the end of the shaft comprise a D-shaped hole and a D-shaped shaft end.

13. The reel of any one of claims 1-12 wherein the first means, second means, washer, spring and drive are substantially disc-like.

14. The reel of any one of claims 1-6 wherein the plate is rectangular in shape.

15. In an open face spinning reel used for casting a bait attached to a fishing line and for retrieving the bait and fishing line after casting, the reel having a housing, a center shaft mounted in the housing, a spool securely mounted on the center shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, limited rotation of the spool being desirable when retrieving the bait with a fish caught thereon, the improvement comprising a free-floating drag assembly that permits such limited spool rotation, comprising:

(a) the center shaft having a forward end supporting the spool and a rearward end with a modified square shaft portion, (b) a drag adjustment screw mounted on the square shaft portion and having a flat washer portion and an elongated shank, the shank being semi-cylindrical with longitudinal flat portions and the end being threaded, the shank having a concentric longitudinal hole with the shank sufficiently long for a sliding fit with the shaft, (c) a first friction disc mounted on the shank adjacent the washer portion, (d) a housing cup having a substantially flat back closure with a center hole therein and a circular side wall secured at a first end to the closure and a second end being open, the wall having a serrated tooth-shaped exterior surface and at least one open notch extending through the wall at the second end, the hole sufficiently large to slip-fit mount on the shank, a first groove near the second end on the internal side wall, (e) a second friction disc mounted on the shank adjacent the cup back closure, (f) a flat washer mounted on the shank and adjacent the second disc, (g) a flat spring mounted on the shank adjacent the flat washer, the spring having radially projecting arms in contact with the washer, (h) an alignment plate having a rectangular exterior shape and slip-fit mounted on the shank being adjacent the spring, the rectangular shape preventing rotation thereof in the housing and preventing rotation of the screw when mounted on the housing, (i) a disc drive having a square hole in the center for slip-fit mounting on the square shaft portion and radially extending lug, the disc mounted in the cup with the lug operably engaged with the notch, (j) a retainer clip mounted in the first groove securing the disc drive, the flat portion of the screw and first disc in the cup, (k) a rear hole in the housing coaxial with the shaft, the threaded end of the shank mounted in the housing hole with a portion extending outside the housing, and (l) means mounted on the threaded shank for tightening or loosening the drag assembly.

* * * * *